United States Patent
Gonsalves et al.

[19]

[11] Patent Number: 6,137,919
[45] Date of Patent: *Oct. 24, 2000

[54] APPARATUS AND METHODS FOR FEATHERING A COMPOSITE IMAGE

[75] Inventors: Robert Gonsalves, Wellesley; Chia-Sheng Chou, Cambridge, both of Mass.

[73] Assignee: Avid Technology, Inc., Tewksbury, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/832,871

[22] Filed: Apr. 4, 1997

[51] Int. Cl.$^7$ .................................................... G06K 9/36
[52] U.S. Cl. ........................... 382/284; 348/586; 348/597
[58] Field of Search .............................. 382/284; 348/584, 348/598, 586, 590, 591, 597, 587; 345/435

[56] References Cited

U.S. PATENT DOCUMENTS

| | | | |
|---|---|---|---|
| 4,698,666 | 10/1987 | Miller et al. | 348/584 |
| 4,827,344 | 5/1989 | Astle et al. | 348/597 |
| 4,831,447 | 5/1989 | Lake | 348/597 |
| 5,084,865 | 1/1992 | Koike | 370/406 |
| 5,140,416 | 8/1992 | Tinkler | 382/173 |
| 5,241,372 | 8/1993 | Ohba | 348/578 |
| 5,325,449 | 6/1994 | Burt et al. | 382/284 |
| 5,347,622 | 9/1994 | Takemoto et al. | 348/586 |
| 5,444,835 | 8/1995 | Turkowski | 395/135 |
| 5,479,922 | 1/1996 | Reichl | 128/630 |
| 5,488,674 | 1/1996 | Burt et al. | 382/284 |
| 5,557,339 | 9/1996 | Dadourian | 348/586 |
| 5,630,037 | 5/1997 | Schindler | 348/598 |

FOREIGN PATENT DOCUMENTS 0517035  12/1992  European Pat. Off.  ........ G06F 15/68

*Primary Examiner*—Amelia Au
*Assistant Examiner*—Jingge Wu
*Attorney, Agent, or Firm*—Wolf, Greenfield & Sacks, P.C.

[57] ABSTRACT

The invention provides a mechanism and process for feathering a first image and a second image in a composite frame. In this process an original matte image is defined according to the first and second images. A portion of the original matte image is box filtered horizontally and vertically to generate an intermediate matte image. At least a portion of the intermediate matte image is box filtered horizontally and vertically to generate a processed matte image. A composite image including the first image and the second image is then generated according to the box-filtered processed matte image.

22 Claims, 8 Drawing Sheets

APPARATUS AND METHODS FOR FEATHERING A COMPOSITE IMAGE

FIELD OF THE INVENTION

The present invention relates generally to image editing systems, and more particularly, to a method and apparatus for feathering two images in a composite frame.

BACKGROUND OF THE INVENTION

Producers of motion video programs use a variety of special effects to produce a final product. A graphics editor performs the task of adding special effects to motion video segments using a graphics workstation.

Feathering is a special effect that blurs one or more portions of a video frame. Feathering often is used when creating a composite video frame from a foreground image and a background image. The graphics editor feathers the border between the images thereby blending the images together to create an effect that the two images are truly one image. As a result an object of the foreground image appears disposed within the background image. For example, a composite frame including a foreground image of two people walking and a background image of a desert scene, when feathered, provides an appearance of the two people walking in the desert.

The graphics editor generally manipulates a number of frames to create a composite frame, as illustrated in FIG. 1. Typically, the graphics editor takes a foreground image 24 from a first frame 20, and a background image 26 from a second frame 28, and combines them using a matte image in a matte frame 32 to form a composite frame 38. The matte image is a gray scale image that the graphics workstation uses when generating the composite frame 38. In particular, the light area of the matte image indicates to the graphics workstation that the area 24 of the first frame 20 is to be used as the foreground image, and that the area 22 is to be ignored. Similarly, the dark area 36 of the matte image indicates that the area 26 of the second frame 28 is to be used as the background image.

Before generating the composite frame 38, the graphics editor modifies the matte image so that the graphics workstation generates a feathering effect between the foreground and background images 24 and 26. In particular, the border area between the light and dark area of the matte image is filtered. If the matte image uses a gray scale that ranges between 0 and 255, the dark area for the background is 0, the light area for the foreground is 255, and the border area between the dark area and light area has values between 0 and 255 depending on the type of filtering applied to the matte image. The degree of realism in the composite frame 38 often depends on the type of filtering. When filtering is poor, the viewer can identify a border 36 between the foreground image and the background image so that the effect of interaction between objects in the two images is diminished or lost.

One conventional filter is a box filter which is commonly implemented as a finite impulse response filter (FIR). When a graphics editor filters a matte image through a box filter, the graphics editor identifies a border area in the matte image, and applies the box filter to each pixel of the border area. FIG. 2 illustrates a 3×1 box filter function. According to this box filtering function, a presently processed pixel value $P_a$ is set equal to an average of pixel values $P_{a-1}$, $P_a$ and $P_{a+1}$. Each pixel value is equally weighted as indicated by the flat slope of the box filtering function.

Filtering can be applied in two dimensions. FIG. 3 illustrates a 3×3 box filtering function. Here the value of the center pixel is set to be the average of the values of the center pixel and the eight surrounding pixels, and the value of each pixel is equally weighted.

Another type of filter is a Gaussian filter which is also commonly implemented as an FIRS The Gaussian filter uses a Gaussian curve, as illustrated in FIG. 4. The Gaussian filter weights each pixel according to its proximity to the pixel being processed, i.e., the center pixel. FIG. 4 shows a 3×1 Gaussian filter that weights the pixel $P_a$ by more than the adjacent pixels $P_{a-1}$ and $P_{a+1}$. A Gaussian filter can be implemented as a two pass FIR, one pass for the horizontal direction, and one pass for the vertical direction.

Producing composite frames using such filtering techniques has certain drawbacks. In particular, using a conventional box filtered matte image to create a feathered composite frame typically provides unsatisfactory results, i.e., the composite frame does not provide a realistic appearance of interaction between objects in the foreground and background images of the composite frame. Also, box filtering provides biased results when the width of the filter is defined by an even number of pixels. For example, a typical 4×1 box filter processes the present pixel, one pixel to the left of the present pixel, and two pixels to the right of the present pixel. This unbalanced use of image data effectively shifts the results by half a pixel, and may be noticeable to the viewer. In particular, when playing a sequence of frames, portions of the video image may appear to jitter due to box filtering using an even width box filter.

A composite frame generated from a Gaussian filtered matte image generally provides suitable results. That is, the composite frame provides a realistic appearance that objects in the foreground image are disposed within the background image. However, Gaussian filtering requires a substantial amount of processing time since each pixel value must be multiplied by a weighted coefficient. For example, a 32×32 Gaussian filter operating on a 132 MHZ Power PC available from Apple Computer of Cupertino, California, requires approximately 1.5 minutes to filter completely a typical matte image having a dimension of 720×486 pixels. Accordingly, Gaussian filtering is impractical for feathering frame sequences of 100 frames or even 1000 frames as often desired in the movie and television industries. Furthermore, as the width of the Gaussian filter increases, processing time increases. In particular, each pixel increase in the width of a Gaussian filter adds one multiply operation per pass and one add operation per pass for each pixel to be processed.

SUMMARY OF THE INVENTION

The present invention overcomes these drawbacks by box filtering a matte image horizontally with tail canceling, and vertically with tail canceling, a first time and a second time.

Accordingly, one aspect of the invention is a computer-implemented process for feathering a first image and a second image in a composite frame. In this process an original matte image is defined according to the first and second images. A portion of the original matte image is box filtered horizontally and vertically to generate an intermediate matte image. At least a portion of the intermediate matte image is box filtered horizontally and vertically to generate a processed matte image. A composite image including the first image and the second image is then generated according to the box-filtered processed matte image.

Another aspect of the invention is that, in the process, the original matte image and the intermediate matte image are filtered using one dimensional (i.e., n×1 and 1×n) box filters.

Another aspect of the invention is an apparatus for feathering a first image and a second image in a composite frame. In this apparatus, a matte image is defined according to the first and second images. At least a portion of the original matte image is box filtered horizontally and vertically to generate an intermediate matte image. At least a portion of the intermediate matte image is box-filtered horizontally and vertically to generate a processed matte image. A composite image including the first image and the second image is then generated based on the box-filtered processed matte image.

Another aspect of the invention is that the apparatus includes one dimensional box filters for filtering the original matte image and the intermediate matte image.

Another aspect of the invention is that the apparatus includes one dimensional box filters for filtering the original matte image and the intermediate matte image.

DETAILED DESCRIPTION

The present invention will be more completely understood through the following detailed description which should be read in conjunction with the attached drawing in which similar reference numbers indicate similar structures.

Figure 1:
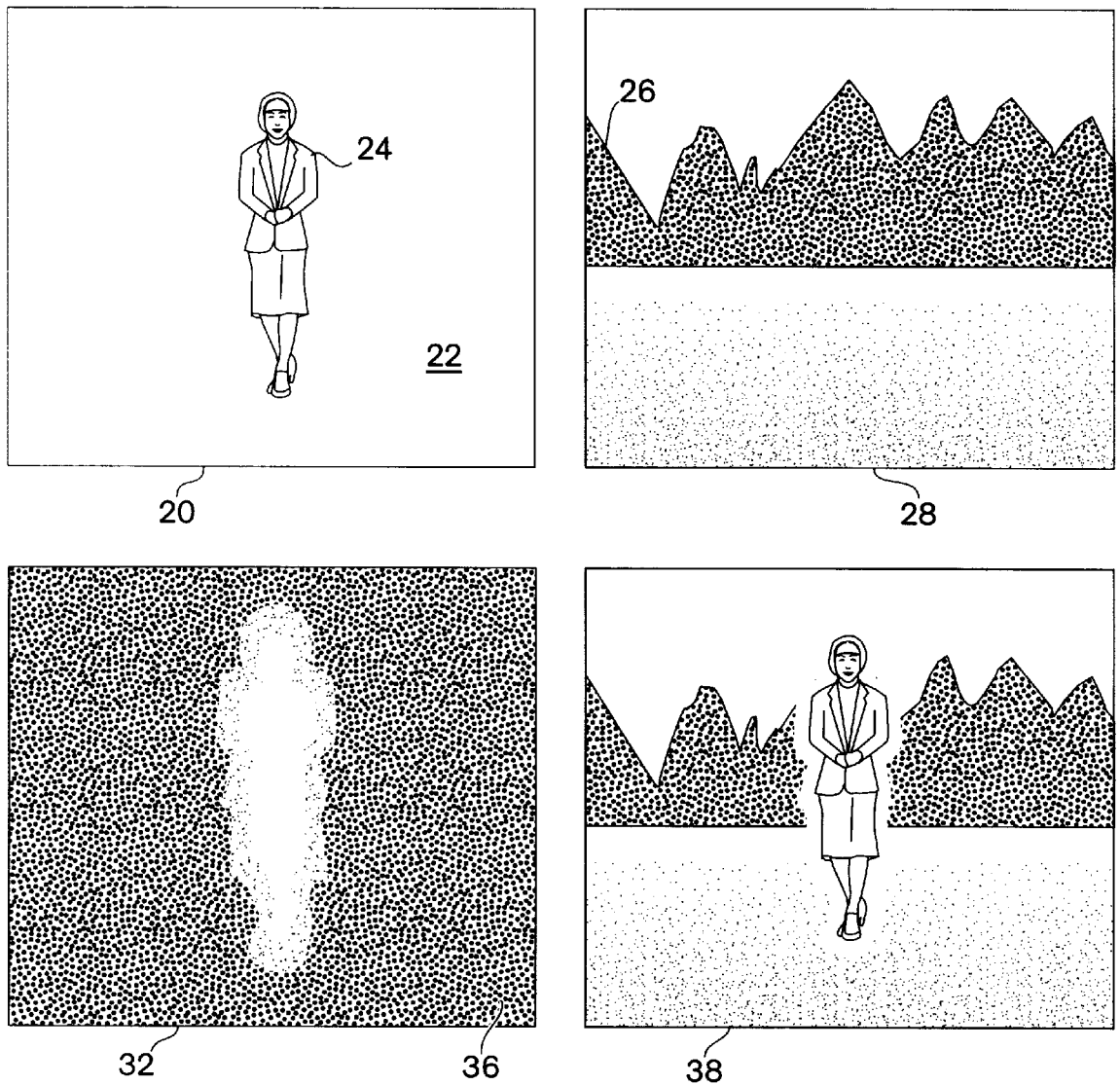
FIG. 1 is a block diagram of a process for generating a feathered composite frame.
Figure 2:
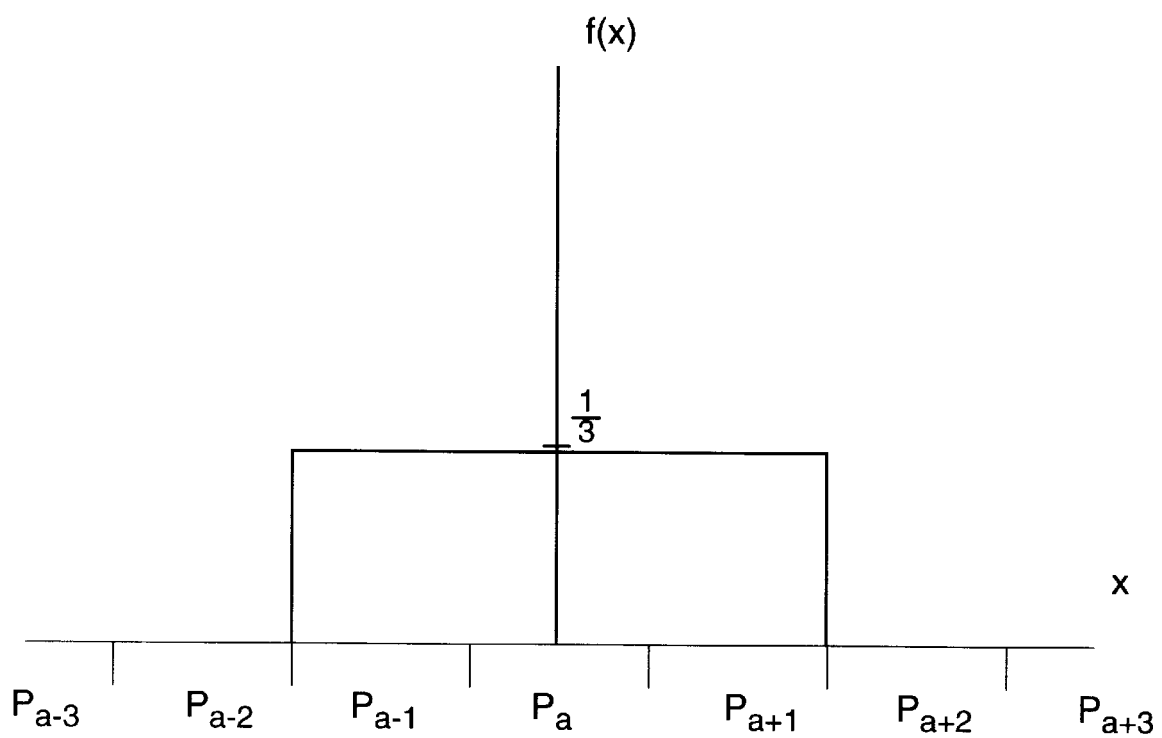
FIG. 2 is a functional diagram of a 3×1 box filter function.
Figure 3:
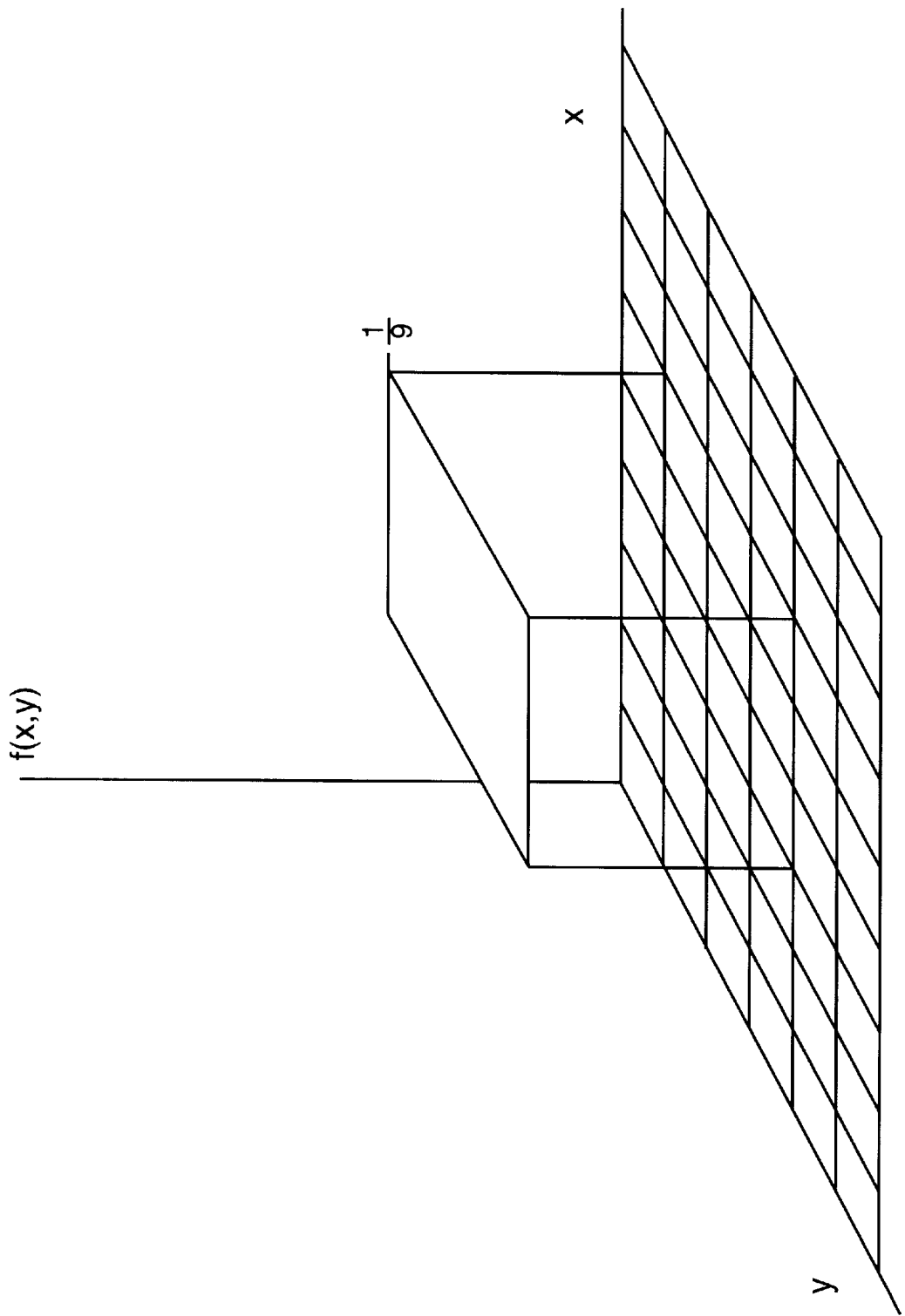
FIG. 3 is a functional diagram of a 3×3 box filter function.
Figure 4:
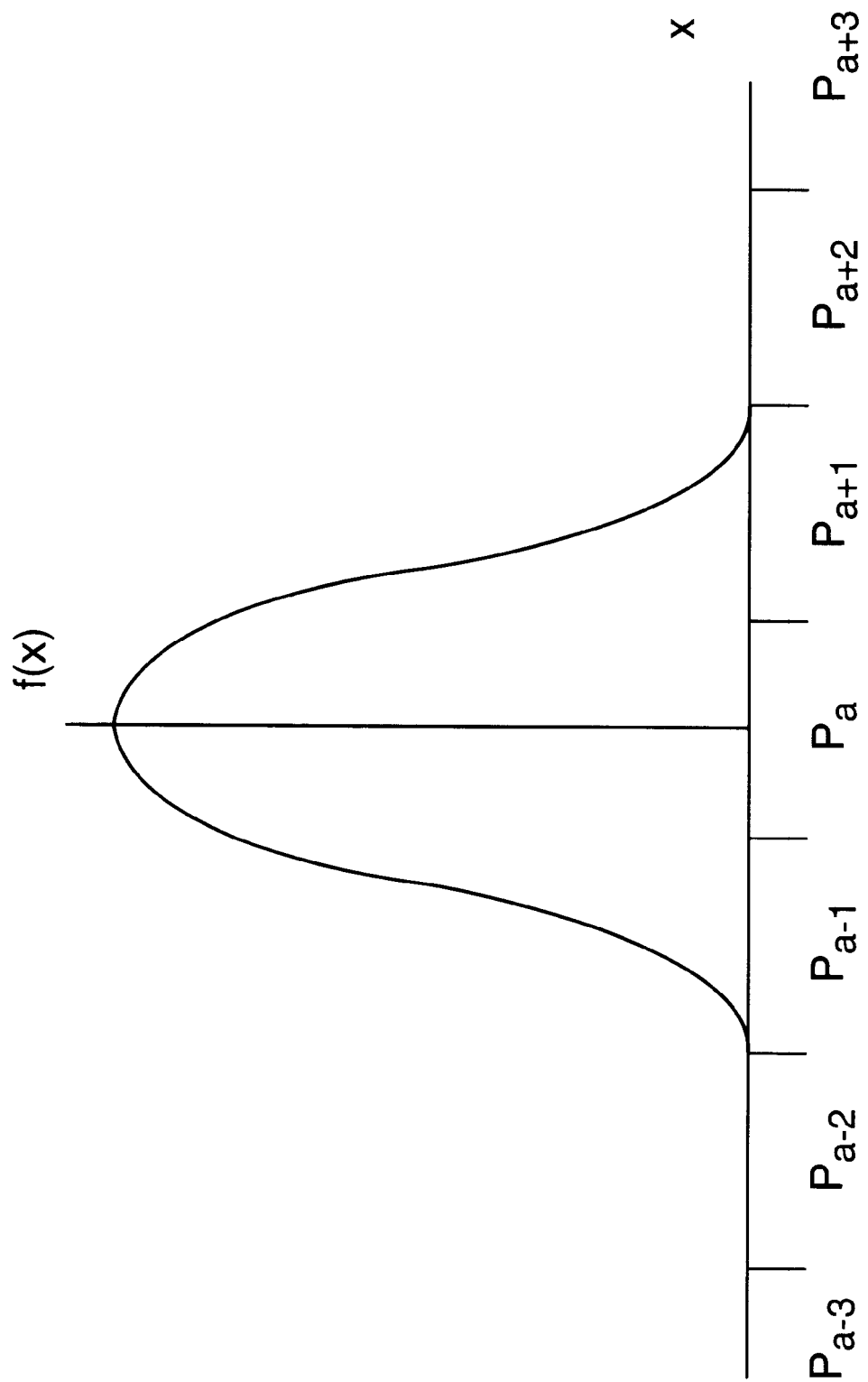
FIG. 4 is a functional diagram of a 3×1 Gaussian filter function.
Figure 5:
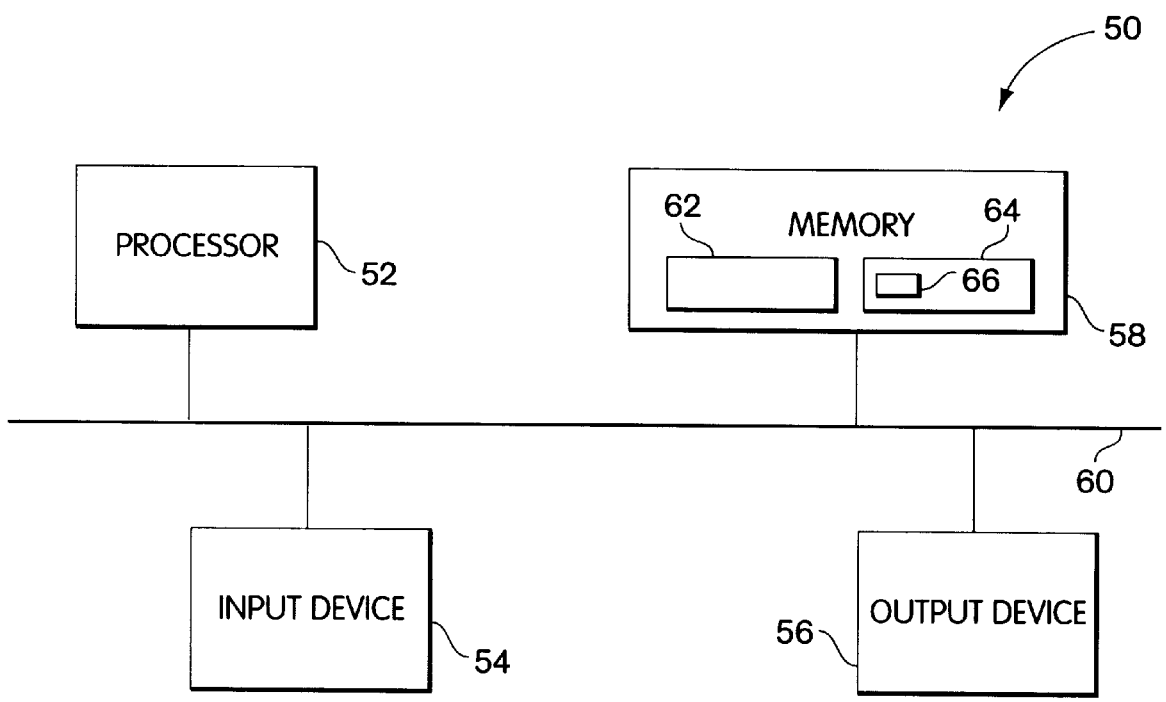
FIG. 5 is a block diagram of a general purpose computer suitable for an embodiment of the invention.

An embodiment of the invention is directed to an apparatus for feathering two images in a composite frame. The apparatus includes a general purpose computer 50 that executes one or more programs 66 when generating the composite frame, as illustrated in FIG. 5. The general purpose computer 50 includes a processor 52, an input device 54, an output device 56, and memory 58 connected together through a computer bus 60. The memory 58 includes primary memory 62 (i.e., fast volatile memory such a dynamic semiconductor memory) and secondary memory 64 (i.e., nonvolatile memory such as magnetic disks). The memory 58 stores the one or more programs 66 executed on the processor 52 to generate the composite frame. The input device 54 receives commands from a graphics editor, and the output device displays the generated composite frame to the graphics editor. The composite frame can be stored in the memory 58 for future use.

Figure 6:
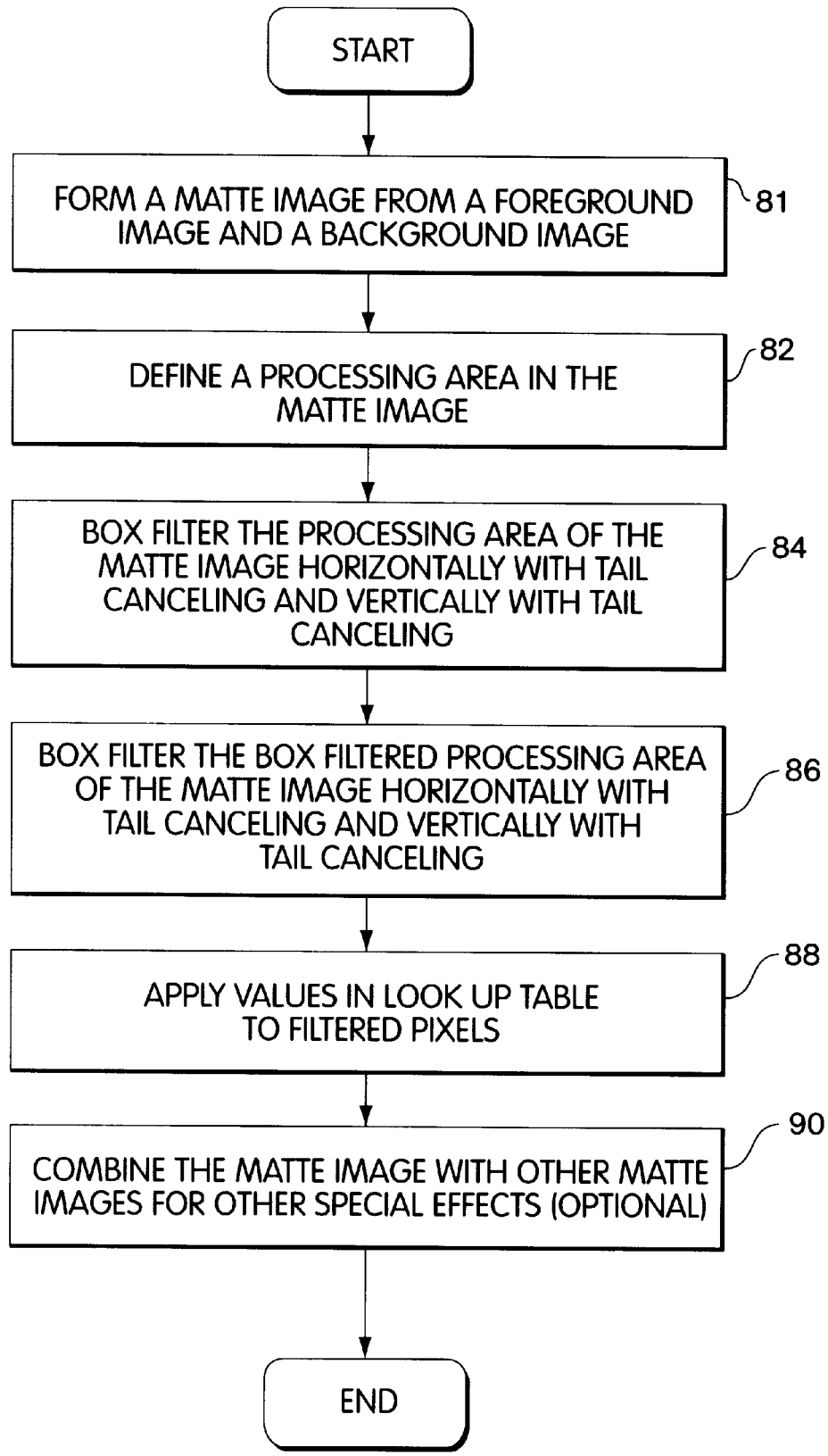
FIG. 6 is a flow diagram of a method according to an embodiment of the invention.

The program 66, when executed by the processor 52, controls the general purpose computer 50 such that it performs a method 80, as illustrated in FIG. 6. In step 81, the graphics editor uses the computer 50 to form a matte image having different gray scale values to indicate areas for a foreground image and a background image. If the gray scale ranges from 0–255, the matte image uses 0 to indicate the area of the background image (indicated by the dark region in the matte frame 32), and 255 to indicate the area of the foreground image (indicated by the light region 30). In step 82, the computer determines a processing area which is defined by the border between the light and dark area, i.e., where the gray scale values transition from 0 to 255. In particular, the computer generates a rectangle around the border area and extends the rectangle in each direction by n pixels to form the processing area.

In step 84, computer 50 filters the processing area of the matte image horizontally with tail canceling, defined below, and vertically with tail canceling. In particular, the computer 50 filters each row of pixels in the processing area using an n×1 horizontal box filter with tail canceling, wherein n is the size of the one dimensional box filter. After each row of pixels in the professing area has been filtered horizontally, the computer 50 filters each column of pixels in the processing area using a 1×n vertical box filter with tail canceling.

When filtering in the horizontal direction using an n×1 box filter, each row or horizontal lines is processed one at a time. In particular, a first pixel $P_{a,b}$ in a horizontal line is processed by computing an intermediate sum $R_{a,b}$ according to the following equation:

$$R_{a,b} = P_{a-(n-1)/2,b} + \ldots + P_{a-1,b} + P_{a,b} + P_{a+1,b} + \ldots + P_{a+(n-1)/2,b} \quad \text{(Eq. 1)}$$

For pixel locations beyond the matte image edge, the box filter uses the value of the edge pixel of the matte image. The general purpose computer 50 stores the intermediate sum $R_{a,b}$ in memory either in the memory 58 or locally in a register of the processor 52. The value of the first pixel $P_{a,b}$ is then set equal to the average pixel value using the following equation:

$$P_{a,b} = R_{a,b}/n \quad \text{(Eq. 2)}$$

The general purpose computer 50 then proceeds to determine a value for a next pixel $P_{a+1,b}$. The n×1 box filter determines a new intermediate sum $R_{a+1,b}$. Rather than recalculating the intermediate sum $R_{a+1,b}$ using Eq. (1), the computer 50 uses the previously stored intermediate sum $R_{a,b}$ to determine the new intermediate sum $R_{a+1,b}$. In particular, the new intermediate sum $R_{a+1,b}$ is determined according to the following equation:

$$R_{a+1,b} = R_{a,b} - P_{a-(n-1)/2,b} + P_{a+((n-1)/2)+1,b} \quad \text{(Eq. 3)}$$

In Eq. (3), the computer 50 subtracts the value of the pixel that is no longer covered by the n×1 box filter, and adds the value of the new pixel covered by the n×1 box filter. This kind of filtering is called "tail canceling" because the value of the pixel that is no longer covered by the box filter is dropped from the filter. This new intermediate sum $R_{a+1,b}$ is stored in memory and used to determine the value for pixel $P_{a+1,b}$ by dividing $R_{a+1,b}$ by n. The computer 50 repeats the tail canceling process when determining a new intermediate value (e.g., $R_{a+2,b}$) and a new value for pixel (e.g., $P_{a+2,b}$) until the end of the horizontal line is reached. The process is then repeated for a next horizontal line beginning with a determination of an initial intermediate value $R_{a,b+1}$ using a calculation similar to that shown in Eq. (1). However, each subsequent determination of an intermediate value uses a calculation similar to that shown in Eq. (3). The horizontal filtering step is finished when each pixel in the processing area has been filtered.

Next, the processing area is vertically filtered with tail canceling using a 1×n vertical box fill in a manner similar to that described above for horizontal filtering. In particular, each column of the processing area is processed one at a time. The value of the first pixel $P_{a,b}$ is determined by generating an intermediate sum $S_{a,b}$ according to the following equation:

$$S_{a,b}=P_{a,b-(n-1)/2,b}+\ldots+P_{a,b-1}+P_{a,b}+P_{a,b+1}+\ldots+P_{a,b+(n-1)/2} \quad \text{(Eq. 4)}$$

Then, the value of the pixel $P_{a,b}$ is determined using the following equation:

$$P_{a,b}=S_{a,b}/n \quad \text{(Eq. 5)}$$

Once the value of the pixel $P_{a,b}$ has been determined, the vertical filter proceeds to process a new pixel $P_{a,b+1}$ in the vertical direction. In particular, the computer determines a new intermediate sum $S_{a,b+1}$ according to the following equation:

$$S_{a,b+1}=S_{a,b}-P_{a,b-(n-1)/2}+P_{a,b+((n-1)/2)+1} \quad \text{(Eq. 6)}$$

It should be clear that the subtracted pixel value corresponds to the pixel that is no longer covered by the vertical box filter after it is moved to process the next pixel $P_{a,b+1}$. Furthermore, the added pixel value corresponds to the pixel that is newly covered by the vertical box filter after it is moved to process the next pixel $P_{a,b+1}$. Then, the value of the pixel $P_{a,b+1}$ is determined using the following equation:

$$P_{a,b+1}=S_{a,b+1}/n. \quad \text{(Eq. 7)}$$

The result obtained by box filtering the processing area through an n×1 horizontal box filter and a 1×n vertical box filter is mathematically equivalent to the result obtained by box filtering the processing area through an n×n box filter. The end result is a ramped effect along the border area between the light and dark area where the pixels along the border increase in value linearly.

In step 86, the processing area is box filtered again horizontally with tail canceling and vertically with tail canceling using the same n×1 and 1×n box filters, respectively. The end result is that the pixels along the border area between the dark and light areas increase in value parabolically. A similar mathematical effect would be achieved if the processing area were processed through a triangle filter with twice the width of the box filter. Such a triangular filter generally requires more computer power because it involves more weight coefficient calculations.

In step 88, the graphics editor may wish to incorporate additional special effects such as color change effects or opacity effects. The graphics editor may incorporate such effects by combining the box filtered matte image area with other matte images using multiplication or minimization operations.

In step 90, the computer 50 generates a feathered composite frame using the matte image according to conventional methods.

Figure 7A:
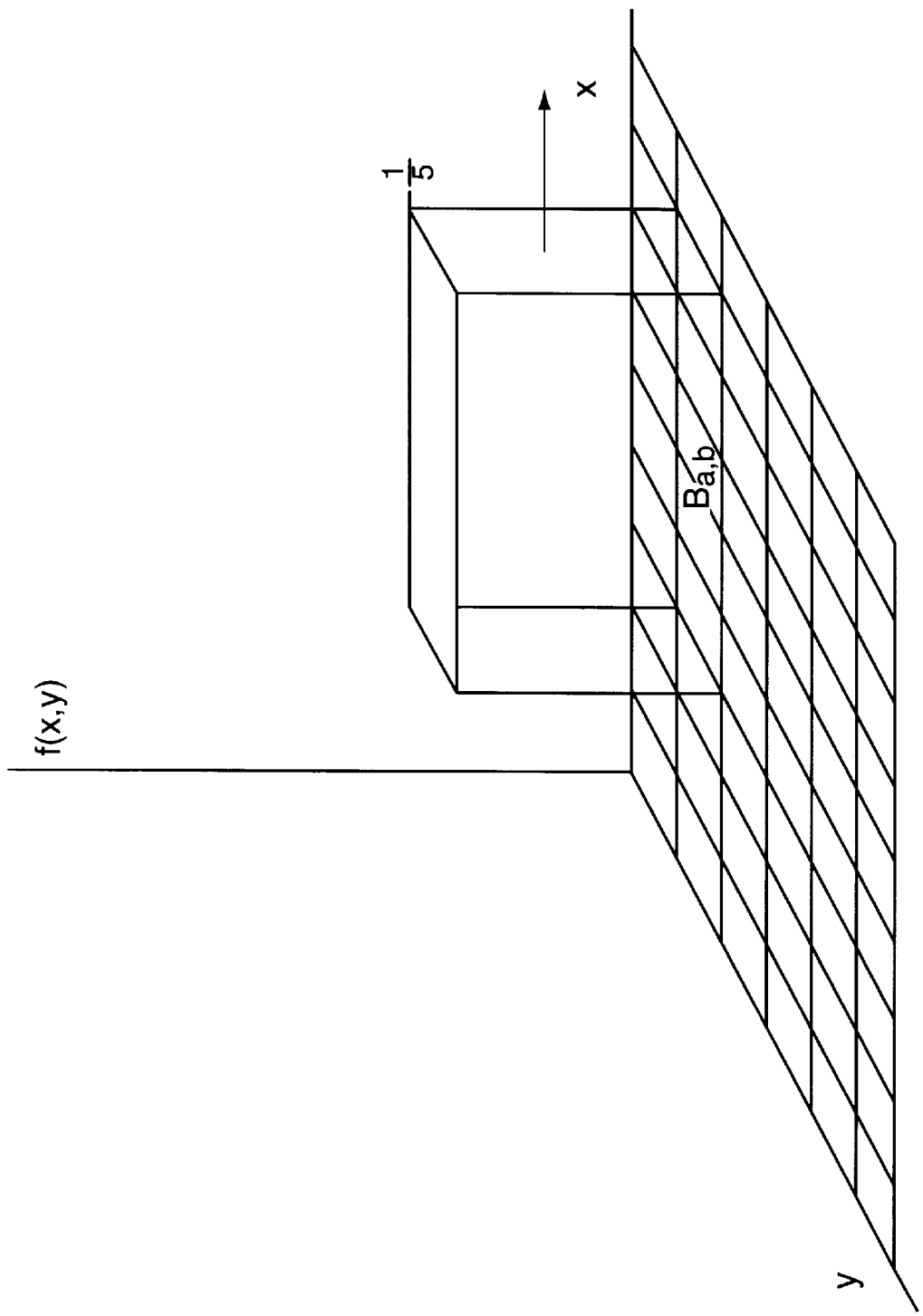
FIG. 7a is a functional diagram of a horizontal filtering function according to an embodiment of the invention.
Figure 7B:
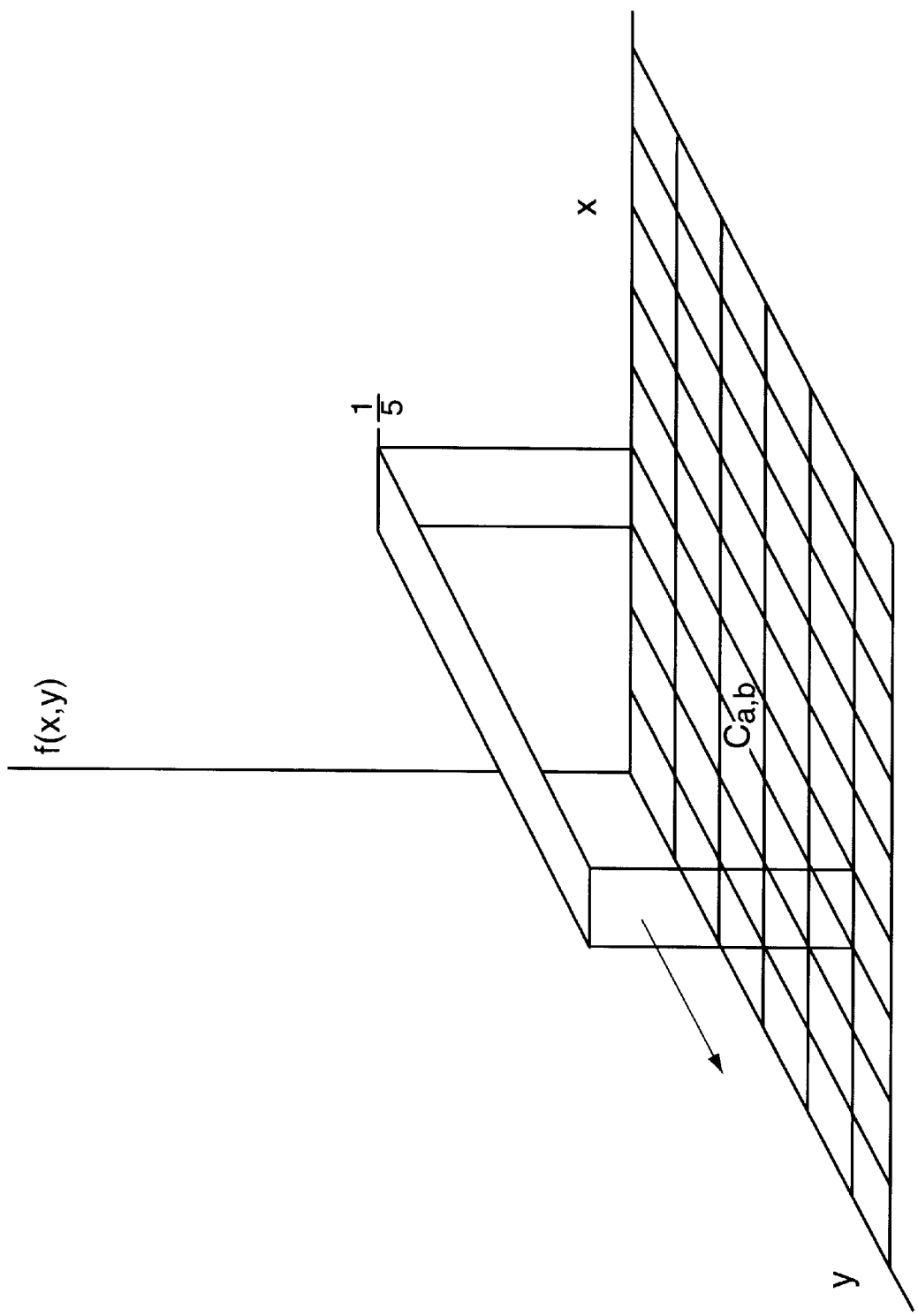
FIG. 7b is a functional diagram of a vertical filtering function according to an embodiment of the invention.

An example will now be explained with reference to FIGS. 7a and 7b. FIG. 7a illustrates how a 5×1 horizontal box filter processes a pixel $P_{a,b}$. The 5×1 horizontal box filter sets the value of the pixel $P_{a,b}$ to be the average of itself $P_{a,b}$, its two neighbors to the left $P_{a-2,b}$ and $P_{a-1,b}$ and its two neighbors to the right $P_{a+1,b}$ and $P_{a+2,b}$. Each pixel value is equally weighted. Then, the 5×1 box filter proceeds horizontally to process an adjacent pixel. When processing the adjacent pixel, the value is determined using an intermediate value calculated using a tail canceling operation. In particular, as described above, the computer 50 subtracts the pixel value of the pixel that is no longer covered by the box filter from the intermediate value, and adds the value of the newly covered pixel to the intermediate value. FIG. 7b illustrates a 1×5 vertical box filter for processing a pixel $P_{a,b}$ in a similar manner.

Filtering the processing area through a 5×1 horizontal box filter with tail canceling and a 1×5 vertical box filter with tail canceling is equivalent to filtering the processing area through a 5×5 box filter. However, processing time is reduced by the tail canceling process so that the majority of pixel value determinations only include one subtract operation, one add operation, and one divide operation for each pass.

Composite frames generated using the method 80 are generally of substantially higher quality than those that are processed once by a box filter. In particular, results of the method 80 are difficult to distinguish from composite frames generated using a Gaussian filter. Furthermore, the time required to box filter the processing area using the method 80 is substantially less than that required by either a conventional box filter or a Gaussian filter.

Modifications and enhancements can be made to the above-described embodiments, and are intended to be included within the scope of the invention. For example, the order of horizontally filtering and vertically filtering may be reversed. According to an embodiment of the invention, processing area is vertically filtered with tail canceling before being horizontally filtered with tail canceling. The end result after box filtering the processing area first vertically, then horizontally, is equivalent to filtering the processing area first horizontally, then vertically.

Additionally, the box filter can have an even filter width without biasing the image in a particular direction. In particular, when filtering the processing area, the first pass through the box filter should bias each pixels in one direction, e.g., to the left. The second pass through the box filter should bias each pixel in the opposite direction, e.g., to the right. The end result is that there is no overall biasing.

Also, it should be understood that the filter widths of the horizontal box filter and the vertical box filter can be extended without significantly decreasing performance. In particular, only the initial pixel value calculation is affected, i.e., the calculation includes one additional add operation. No other additional operations are required to extend filter width per pass.

Additionally, it should be understood that the filter width of the one dimensional horizontal box filter and the filter width of the one dimensional vertical box filter do not need to be the same. Different feathering effects are possible by using different filter widths for the horizontal and vertical box filters, and by using different filter widths for the box filters when processing the matte image for the first time, and subsequently processing the matte image for the second time.

Furthermore, the embodiments are suitable for real time applications since processing time is substantially reduced. Accordingly, foreground and background images can be blended in real time.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims and equivalent thereto.

What is claimed is:

1. A method for feathering a first image and a second image in a composite frame, comprising the steps of:

receiving an original matte image;

a first box filtering step including box filtering at least a portion of the original matte image horizontally and vertically to generate an intermediate matte image;

a second box filtering step including box filtering at least a portion of the intermediate matte image horizontally and vertically to generate a processed matte image; and generating a composite image by blending the first image and the second image together according to the processed matte image;

wherein the step of box filtering the original matte image includes a step of processing the original matte image through a first box filter having an even filter width that is biased in a first direction: and wherein the step of box filtering the intermediate matte image includes a step of processing the intermediate matte image through a second box filter having an even filter width that is biased in a second direction that is opposite the first direction.

2. An apparatus for feathering a first image and a second image in a composite frame, comprising:

a general purpose computer including:

a memory that stores a program; and a processor that, when executing the program, receives an original matte image, box filters, in a first filtering step, at least a portion of the original matte image horizontally and vertically to generate an intermediate matte image, box filters, in a second filtering step, at least a portion of the intermediate matte image horizontally and vertically to generate a processed matte image, and generates a composite image by blending the first image and the second image together according to the box-filtered processed matte image;

wherein the processor, when box filtering the original matte image, processes the original matte image through a first box filter having an even filter width that is biased in a first direction; and wherein the processor. when box filtering the intermediate matte image, processes the intermediate matte image through a second box filter having an even filter width that is biased in a second direction that is opposite the first direction.

3. The method of claim 1, wherein each matte image includes a plurality of pixels, and wherein at least one of the steps of box filtering includes applying a box filter sequentially to pixels in an image and includes a step of tail canceling to compute a result of box filtering.

4. The method of claim 1, wherein at least one of the steps of box filtering includes a step of processing a matte image through a one dimensional box filter.

5. The method of claim 1, wherein each matte image includes a plurality of rows of pixels, and wherein the method further comprises a step of:

increasing a filter width of a box filter so that the box filter performs an extra add operation when calculating a value of an initial pixel in a row of pixels of a matte image, while maintaining the number of add operations when calculating values of other pixels in the row of pixels of the matte image.

6. The method of claim 1, wherein at least one of the steps of box filtering includes steps of:

processing a matte image through a one dimensional vertical box filter having a first width; and processing the matte image through a one dimensional horizontal box filter having a second width that is different than the first width.

7. The method of claim 1, wherein each step of box filtering and the step of generating is performed in real time, and wherein the method further includes a step of:

displaying the composite image on a display device in real time.

8. The apparatus of claim 2, wherein each matte image includes a plurality of pixels, and wherein the processor, when box filtering a matte image, tail cancels the matte image so that a value of a pixel of the tail canceled matte image is a result of a subtract operation.

9. The apparatus of claim 2, wherein the processor box filters at least one of the matte images using a one dimensional box filter.

10. The apparatus of claim 2, wherein each matte image includes a plurality of rows of pixels, and wherein the processor, when executing the program, increases a filter width of a box filter by performing an extra add operation when calculating a value of an initial pixel in a row of pixels of a matte image, while maintaining the number of add operations when calculating values of other pixels in the row of pixels of the matte image.

11. The apparatus of claim 2, wherein the processor, when box filtering a matte image, processes the matte image through a one dimensional vertical box filter having a first width, and processes the matte image through a one dimensional horizontal box filter having a second width that is different than the first width.

12. The apparatus of claim 2, wherein the processor executes the program in real time, and wherein the general purpose computer further includes a display device that displays the composite image in real time.

13. A method of generating a composite frame from a foreground image contained in a first frame and a background image contained in a second frame, the method comprising the steps of:

generating an original matte image having an original processing area;

a first filtering step that generates an intermediate matte image from the original matte image, the first filtering step including steps of:

applying a horizontal box filter to at least a portion of the original processing area; and;

applying a vertical box filter to at least a portion of the original processing area;

a second filtering step that generates a processed matte image from the intermediate matte image, the intermediate image having an intermediate processing area, the second filtering step including steps of:

applying a horizontal box filter to at least a portion of the intermediate processing area; and applying a vertical box filter to at least a portion of the intermediate processing area;

generating a composite image by blending the first image and the second image together according to the processed matte image;

wherein each matte image includes a plurality of rows of pixels, and wherein the method further comprises a step of:

increasing a filter width of a box filter so that the box filter performs an extra add operation when calculating a value of an initial pixel in a row of pixels of a matte image, while maintaining the number of add operations when calculating values of other pixels in the row of pixels of the matte image.

14. The method of claim 13, wherein each matte image includes a plurality of pixels, and wherein at least one of the steps of box filtering includes applying a box filter sequentially to pixels in an image and includes a step of tail canceling to compute a result of box filtering.

15. The method of claim 13, wherein at least one of the steps of box filtering includes a step of processing a matte image through a one dimensional box filter.

16. The method of claim 13, wherein at least one of the steps of box filtering includes steps of:

processing a matte image through a one dimensional vertical box filter having a first width; and processing the matte image through a one dimensional horizontal box filter having a second width that is different than the first width.

17. The method of claim 13, wherein each step of box filtering and the step of generating is performed in real time, and wherein the method further includes a step of:

displaying the composite image on a display device in real time.

18. An apparatus for feathering a first image and a second image in a composite frame, comprising:

a general purpose computer including:

a memory that stores a program; and a processor that, when executing the program, receives an original matte image, box filters, in a first filtering step, at least a portion of the original matte image horizontally and vertically to generate an intermediate matte image, box filters, in a second filtering step, at least a portion of the intermediate matte image horizontally and vertically to generate a processed matte image, and generates a composite image by blending the first image and the second image together according to the box-filtered processed matte image;

wherein each matte image includes a plurality of rows of pixels, and wherein the processor, when executing the program, increases a filter width of a box filter so that the box filter performs an extra add operation when calculating a value of an initial pixel in a row of pixels of a matte image, while maintaining the number of add operations when calculating values of other pixels in the row of pixels of the matte image.

19. The apparatus of claim 18, wherein each matte image includes a plurality of pixels, and wherein the processor, when box filtering a matte image, tail cancels the matte image so that a value of a pixel of the tail canceled matte image is a result of a subtract operation.

20. The apparatus of claim 18, wherein the processor box filters at least one of the matte images using a one dimensional box filter.

21. The apparatus of claim 18, wherein the processor, when box filtering a matte image, processes the matte image through a one dimensional vertical box filter having a first width, and processes the matte image through a one dimensional horizontal box filter having a second width that is different than the first width.

22. The apparatus of claim 18, wherein the processor executes the program in real time, and wherein the general purpose computer further includes a display device that displays the composite image in real time.

* * * * *